Nov. 11, 1947.   K. C. BUGG ET AL   2,430,554
TOOL FOR BEADING AND FLARING TUBES
Filed June 21, 1944   2 Sheets-Sheet 1
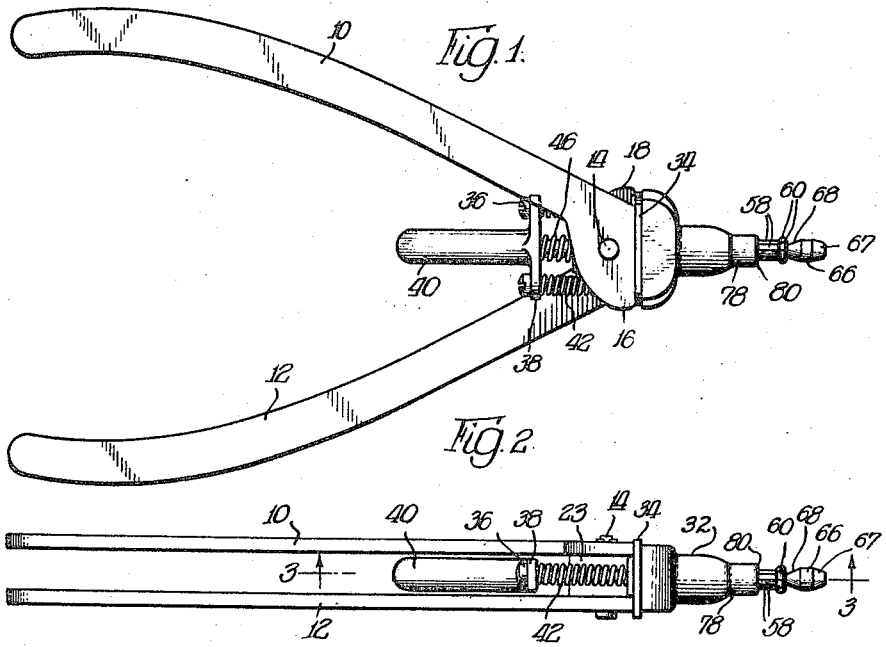
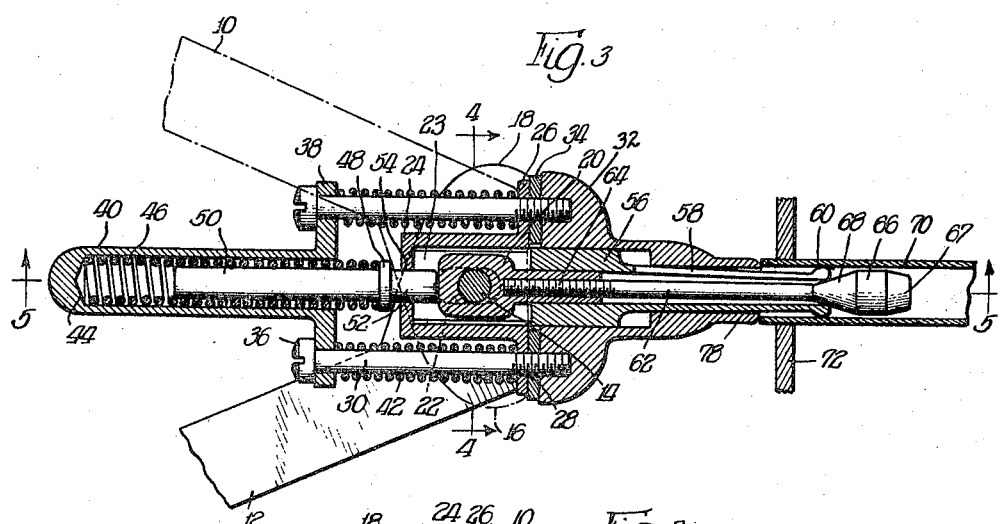
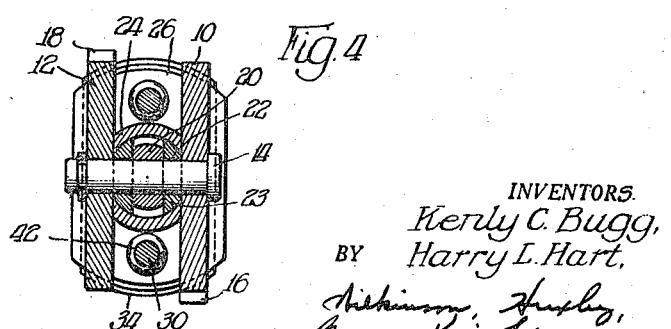
INVENTORS.
Kerly C. Bugg,
Harry L. Hart,
BY Nov. 11, 1947.  K. C. BUGG ET AL  2,430,554

TOOL FOR BEADING AND FLARING TUBES

Filed June 21, 1944  2 Sheets-Sheet 2

INVENTORS.
Kenly C. Bugg,
Harry L. Hart,
BY
Wilkinson, Huxley, Byron
& Knight
Attys.

Patented Nov. 11, 1947

2,430,554

UNITED STATES PATENT OFFICE 2,430,554

TOOL FOR BEADING AND FLARING TUBES

Kenly C. Bugg and Harry L. Hart, Fort Wayne, Ind.; said Hart assignor to said Bugg Application June 21, 1944, Serial No. 541,425

9 Claims. (Cl. 153—80)

This invention pertains to tube beading and expanding devices and, more particularly, to devices for beading and controllably expanding tubes of radiators and the like, for securing said tubes tightly in the holes of sheets or headers whereby they may be brazed thereto.

In the fabrication of certain articles it is frequently desirable to fasten tubes into sheets or to condition the tubes for brazing to sheets, such as in the manufacture of devices wherein tubes are secured to headers. Examples of the fabrication of such articles are the fabrication of radiators and other heat exchangers.

In some of these instances it is highly desirable and necessary to fasten for subsequent brazing very small diameter tubes of great number and having thin walls into headers. For example, such tubes may be placed very close together and upwards of 300 of such tubes of .210 inch O. D. may be placed in 16 square inches. Further, it is frequently desirable to use tubes having a section other than round, such as square, hexagonal, etc., and these must be fastened with exactness and must be tight.

The methods which have been employed use rubber dies, or hydraulic means or mechanical beading devices which merely form beads. In these instances the bead or flange formed in the tube on either side of the header cannot be exactly controlled for brazing condition; and at least an equally important consideration is the fact that the external wall of the tube by existing methods, as before mentioned, cannot be expanded and held to tightly fit the larger I. D. of the header holes. Thus there is no assurance that capillary attraction of the brazing material will cause a complete filling of the holes between the header and the tube, i. e., a filling from the edge of the hole to the bead and tube, and the wall of the hole and tube, and consequently there is the danger that the bead or flange will not be formed closely adjacent the header where they may be brazed. Thus there is danger of leakage, resulting in the rejection of the fabricated part. By the use of the hydraulic method or the rubber die method an inadequate joint may not only be formed, but it is very difficult to bead or flange any tube having a section other than round. Further, using either of these methods is objectionable in that there is danger that where the wall of the tube is not of uniform thickness or is not of uniform hardness, that there will be a distortion of the tube at the thin or weaker part, resulting in fracture or deformation of the tube to an extent where it may fail in test or service.

Where tubes are being handled having a section other than round, it is extremely difficult to form the angularly disposed walls into a proper bead. Likewise, the wear of the rubber die is extremely rapid.

In the use of the rubber die method where a plurality of beads are being formed, in order to even approximate uniform beads, the rubber die must be exactly uniform in resilience, which is extremely difficult to attain, particularly in small dies and if there is no uniformity, then the beads will not be uniform and the conformation will not be predictable.

Further, in the methods now being used, it is impossible to bead the tubes to the header in such a manner that they will tightly engage the adjacent parts of the header, so that it is practically impossible to braze the tubes by means of the material already applied to the header for brazing purposes. In addition to the above objections, the methods now in use are expensive, both from the standpoint of equipment needed therefor and from the standpoint of man hours for fabrication as well as maintenance and replacement.

In the fabrication of radiators or other heat exchanging devices there frequently are a large number of tubes of small diameter used, and while they have substantially the same O. D. they still may vary somewhat in this respect. Further, the holes in the headers for receiving the tubes may vary somewhat. Even though such conditions may exist, the tubes must be tightly secured to the headers or leakage will occur.

It is, therefore, an object of this invention to provide an inexpensive device capable of controllably forming uniform beads or flanges with extreme rapidity.

Another object of the invention is to provide a device for forming beads or flanges in tubes of any cross-sectional shape and with little appreciable wear on the tool.

A further object of the invention is to provide a tool for beading or flanging a tube to a plate or header in such a manner that the bead or flange is properly disposed with respect to the plate or header, whereby the bead or flange can be readily and quickly brazed to the plate or header through brazing material usually applied thereto.

A still further object of the invention is to provide a tool for forming a bead or flange after application of the tube to a header or other plate, the bead or flange being so formed as to grip the plate or header and also that portion of the tube filling the hole in the header is disposed into tight engagement with the header, even to the extent of slightly expanding the hole during formation of the bead. This is particularly important where such material as aluminum is being used. For example, if hard tubes were being expanded, there is danger that the material of the tube would spring back away from the header so as actually to have a loose condition, but where not only the tube is expanded but also the wall of the hole of the header is expanded, the spring-back condition is so nearly uniform as to preclude any such loosened condition.

A yet further object of the invention is to provide a tool which is so constructed and arranged that the tube to be applied to a header, junction box or plate may be applied to the tool and piloted by it into position after which it may be set.

Another further object of the invention is to provide a tool for beading tubes to headers, plates, junction boxes and the like, the tool being provided with pilot or supporting means which will uniformly dispose or position the tube, and where double headers, junction boxes, plates and the like are used this tool provides automatic spacing means for the plates, junction boxes or headers.

A different object of the invention is to provide a tool for beading, flanging and the like, the tool including a plurality of expanding dies, the dies being so constructed and arranged, one with respect to the other, that in their expanded or working condition they conform to the true shape of the tube to be flanged, as well as to the bead or flange. For example, if a round bead is to be formed, the die parts in expanded position assume a true circular shape.

Still a different object of the invention is to provide a tool for beading, flanging and the like, said tool including an expandable die comprising a plurality of parts, the parts being initially formed in the size of the flange, bead and tube, and then collapsed to a position where there is substantially no space between adjacent fingers of the die and the die may be readily inserted into the tube for the beading or flanging operation.

Yet a different object of the invention is to provide a tool for beading or flanging a tube into a header, the bead or flanges being so positioned after formation that the beads or flanges actually pinch the brazing material on the header, whereby perfect brazing is assured.

Another further object of the invention is to provide a simple, light, sturdy and inexpensive portable tool for beading or flanging tubes or other cylindrical or tubular members applied as repair or replacement parts.

Another object of the invention is to provide a tool for securing means for joining plates or other articles together.

Another object of the invention is to provide a device for beading or flanging tubes into headers or the like to form radiators, condensers or the like, which device is so constructed and arranged that the operation of the tool furnishes means whereby the headers are specifically related or positioned with respect to the baffles within the radiator, condenser or the like, that is, the beading of the tubes causes the headers to be pulled toward the baffles, and inasmuch as all of the tubes are beaded uniformly, the headers are specifically moved toward the baffles in a predetermined manner assuring an adequate contact between baffles and headers.

Another object of the invention is to provide a tool for tightly securing tubes to headers, which tool is operative even though there may be slight variations in the tubes handled or in the holes of the headers receiving said tubes.

Another object of the invention is to provide a device for cold beading or flanging tubes.

Another object of the invention is to provide a device which is so constructed and arranged that any type of bead, flange or key may be formed thereby.

Another object of the invention is to provide an inexpensive portable tool for cold forming a bead or a flange on means such as tubes, eyelets, bushings or other fastening or bearing means.

Another object of the invention is to provide a device for cold fastening or securing tubes to headers and the like, wherein the tube is so tightly secured that it is not necessary to braze or otherwise secure the tube to the header, whereby lighter tubes and headers may be used to thereby increase the efficiency of coolers and the like formed thereby.

Another object of the invention is to provide a tool for cold setting or fastening tubes to headers or the like so tightly that they need not be brazed, the tool making possible, in the case of radiators, such as airplane radiators, the assembly and permanent fastening of the headers, muffs, covers, etc., and thereafter applying and fastening in place the tubes cold. By following this procedure the lightest parts are applied last, namely, the tubes, thus lessening the chance of distortion or otherwise weakening these members, thereby decreasing leakage possibilities.

Another object of the invention is to provide a device which will fasten tubes, eyelets or the like to members such as headers in such a manner that a large amount of the tube is permanently set to form a securing bead or flange.

Another object of the invention is to provide a device which will fasten tubes, eyelets or the like to members such as headers in such a manner that the securing bead or flange is formed by upsetting the metal in the tube or eyelet forming a bead on one side and a flange on the other, the metal of the tube or eyelet moving toward or being upset toward the header.

Another object of the invention is to provide a device which will fasten tubes, eyelets or the like to members such as headers in such a manner that a bead and flare are simultaneously formed, the flare being disposed in the airstream or fluid stream in the case of a heat exchanger of an airplane or other motive vehicle, to diminish the drag.

With these and various other objects in view, the invention may consist of certain novel features of construction and operation as will be more fully described and particularly pointed out in the specification, drawings and claims appended hereto.

In the drawings which illustrate an embodiment of the device and wherein like reference characters are used to designate like parts—

Figure 1 is an elevation of a form of tool embodying the invention, showing the die-fingers in an inoperative or collapsed position;

Figure 2 is an elevation of the tool shown in Figure 1, taken looking upwardly of Figure 1;

Figure 3 is an enlarged fragmentary sectional elevation taken substantially in the plane as indicated by the line 3—3 of Figure 2, showing the die-fingers in inoperative position and inserted in a tube to be secured to a header;

Figure 4 is an enlarged sectional plan view taken substantially in the plane as indicated by the line 4—4 of Figure 3;

Figure 5:
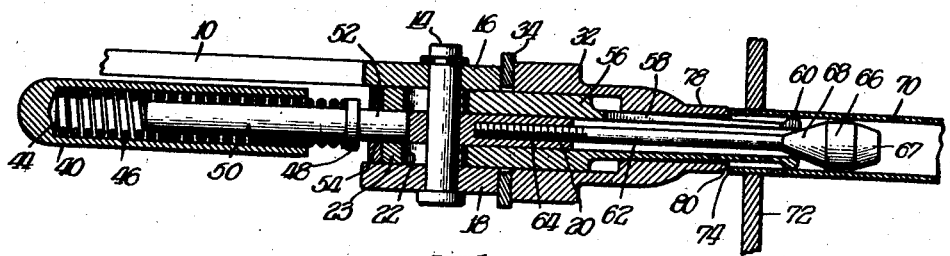
Figure 5 is an enlarged fragmentary sectional elevation taken substantially in the plane as indicated by the line 5—5 of Figure 3 showing the tool in a position where the die-fingers are inserted in a tube, and in collapsed position.

The tool shown is adapted for forming a bead and a flange, or any form of beads, threads, keys, flanges, or the like, on tubes, eyelets, or other tubular members, it being understood that while a tool is illustrated for use in fastening a circular cylindrical tube to a header, the fastening fingers or dies may be of a shape other than round in section. For example, where an octagonal tube is to be secured in an octagonal hole, the die-fingers may form an octagonal configuration.

The tool shown is a manual tool and comprises, essentially, a pair of handles 10 and 12, pivoted as by pin 14, said handles, adjacent to the pivot point, being provided with cams 16 and 18. The pin 14 pivots the handles 10 and 12 to the plunger or retracting yoke 20, and said pin loosely pivots said handles and plunger as through the elongated slot 22 to the die member 23 in the housing 24. The housing 24 is provided with oppositely extending flanges 26, apertured as at 28 to slidably mount the housing 24 on bolts 30, said bolts being secured to the flange-forming housing 32. In the construction shown, a hardened wear plate or spacer 34 is likewise secured to the housing 32 by the bolts 30, and may be of varying thicknesses as desired.

The heads 36 of the bolts 30 form seats for the flanges 38 of the spring housing 40, and springs 42 are interposed between flanges 38 and 26 urging said flanges apart toward a position where the tool is inoperative. The spring housing 40 provides a seat 44 for one end of the spring 46, the other end of said spring seating on seat 48 provided on the plunger 50. The outer end 52 of said plunger extends through an aperture 54 in the housing 24 and engages the retracting yoke 20, urging said retracting yoke toward the right, as viewed in the figures, that is, toward inoperative position.

The die member 23 comprises the base 56 mounted in the housing 24 and slidably mounted in housing 32, and said base 56 is provided with the elongated die-shoes or fingers 58 having bead forming members or ridges 60 thereon. In forming the fingers 58 of the die member, the fingers, as well as the ridges 60, are chosen for their final desired bead forming diameter. The fingers, as well as the ridges, are not only of the proper size, but are of the exact configuration to which they are adapted to ultimately operate.

The ridges 60 must be of a certain depth to form the chosen bead on the tube 70 to be beaded, for proper securing of the tube for the header 72. A plurality of fingers 58 are therefore formed by slitting the originally chosen tubular member which is a part of base 56, a predetermined distance down to the base 56. Enough metal is removed from the slits so that the fingers may be collapsed inwardly the desired amount to permit insertion of the collapsed ridges 60 into the tube as shown in Figure 5.

After the fingers are formed they are collapsed to an inoperative position, and the die member 23 is heat treated to impart resiliency to the fingers so that they will always tend to return to an inoperative position. It is, of course, understood that too much metal must not be removed in forming the fingers as it is desired that the maximum of metal be disposed in the fingers for properly forming the bead on the tube.

Further, the number of fingers are chosen so that as many as possible are provided, but they are of such size that they are not too narrow thereby preventing cutting of the tube to be beaded during the beading operation. In other words, in effect the ridges 60 must be pads or shoes and not cutting edges.

The stem 62 is threaded or otherwise secured as at 64 to the retracting yoke 20 and in inoperative position, that is, the position as shown in Figures 1 and 5, the cam head 66 of the plunger 62 extending outwardly at the end of the fingers. The head 66 is provided with the pilot surface 67 and the cam or conical surface 68 which is adapted to engage the fingers and to spread said fingers when the plunger is moved toward the left, from the position shown in Figures 1 to 5, to the positions illustrated in Figures 6 and 7, a predetermined movement of the plunger spreading the fingers to the predetermined beading position.

Assuming the tool to be in inoperative position, and assuming that tubes such as tube 70 are positioned in the header 72 so that a portion 74 of the tube extends beyond the surface of the header, a portion of the quill, which comprises the die 23 and plunger 62, is inserted into the end of the tube, as shown in Figures 3 and 5. The handles 10 and 12 are then moved toward each other, causing the cams 16 and 18 to ride on the spacer 34, and when the handles are moved to the position shown in Figure 6, that is, the position just prior to linear movement of the quill and housing 24 toward the left from the position shown in Figure 6, to compress the springs 42, the pin 14 will have moved the retracting yoke 20 against spring 46 to draw the cam head 66 inwardly to its maximum predetermined position spreading the fingers and forming the bead 76 on the tube 70.

Figure 6:
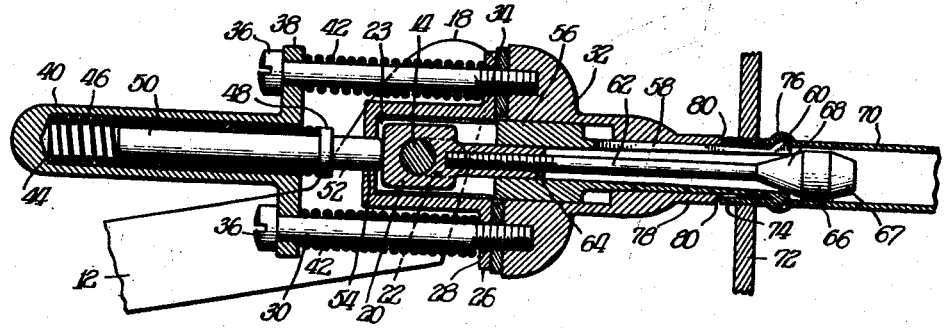
Figure 6 is an enlarged fragmentary sectional elevation corresponding to Figure 3, but showing the initial securing or beading operation of the tool.
Figure 7:
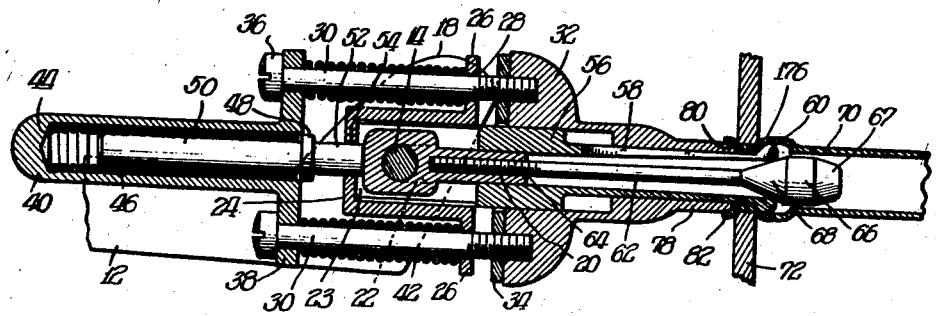
Figure 7 is an enlarged fragmentary sectional elevation corresponding to Figure 6, but showing the tool in position wherein the tube is completely secured.
Figure 8:
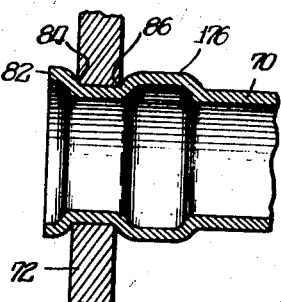
Figure 8 is an enlarged fragmentary sectional elevation showing a tube in final secured position in a header.

Continued movement of the handles 10 and 12 toward each other to the last position shown in Figure 7, causes linear movement of the quill and the housing 24 to compress springs 42 and to linearly move the ridges 60 causing the bead 76 to be elongated into the bead 176 (Figures 7 and 8) and at the same time the flange-forming end 78 of the housing 32, which is undercut or bevelled as at 80, will be caused to be moved toward the header plate 72, as shown in Figure 7, due to the fact that ridges 60 will be arrested by the header plate. Thus the flange 82 will be formed, the flange 82 and the bead 176 being adapted to pinch the header around the periphery of the aperture through which the tube extends as at 84 and 86, it being understood that when the fingers 58 have been moved to an expanded position as shown in Figure 6, they will cause the metal of the tube 70, within the header hole, to tightly engage the sides of the header. Where brazing material is used an initial tight joint is formed pinching the material thus permitting a tighter joint, though with the device shown a fluid tight and pressure tight joint is readily formed cold and in one operation.

Release of the handles 10 and 12 will permit springs 42 and 46 to return the parts in inoperative position as illustrated in the Figures 1, 3 and 5 and the quill may be withdrawn from the tube.

It is understood that we do not wish to be limited by the exact embodiments of the device shown which are merely by way of illustration and not limitation as various and other forms of the device will of course be apparent to those skilled in the art without departing from the spirit of the invention or the scope of the claims.

We claim:

1. In a device of the character described, the combination of a housing member, a quill extending from one end of said housing member, said quill comprising a member slidably mounted in said housing member, and having resilient fingers extending outwardly of said housing member and provided with die members, said fingers being urged toward each other, a stem extending between said fingers and having a cam movable by said stem to separate said fingers, a housing engaging said slidably mounted member, resilient means for urging said last named housing toward said housing member, other resilient means for urging said stem outwardly of said fingers whereby said fingers move toward inoperative position, a member movable to move said stem against said other resilient means to thereby move the cam to separate said fingers, continued movement of said member after a predetermined separation of said fingers, causing said housing to move against its associated resilient means and the separated fingers to move inwardly of said housing member.

2. In a device of the character described, the combination of a housing member, a quill extending from one end of said housing member, said quill comprising a member slidably mounted in said housing member, and having resilient fingers extending outwardly of said housing member and provided with die members, said fingers being urged toward each other, a stem extending between said fingers and having a cam movable by said stem to separate said fingers, a housing, guide means for slidably guiding said housing with respect to said housing member, resilient means urging said housing toward said housing member, a spring housing supported on said guide means, a spring in said spring housing provided with a plunger extending into said housing and urging said stem to a position where said fingers move into inoperative position, pivoted handle members having cams, the pivot being operatively associated with said stem and housing, said handles being adapted to move said cams to cause the pivot of the handles to move said stem through the pivot to separate said fingers and compress said spring, movement of the pivot after separation of the fingers causing movement of said housing against its associated resilient means to move the fingers inwardly of the housing member.

3. In a device of the character described, the combination of a housing member, a quill extending from one end of said housing member, said quill comprising a member slidably mounted in said housing member, and having resilient fingers extending outwardly of said housing member and provided with die members, said fingers being urged toward each other, a stem extending between said fingers and having a cam movable by said stem to separate said fingers, a housing, guide means for slidably guiding said housing with respect to said housing member, resilient means urging said housing toward said housing member, a spring housing supported on said guide means, a spring in said spring housing provided with a plunger extending into said housing and urging said stem to a position where said fingers move into inoperative position, pivoted handle members having cams, the pivot being operatively associated with said stem and housing, said handles being adapted to move said cams to cause the pivot of the handles to move said stem through the pivot to separate said fingers and compress said spring, movement of the pivot after separation of the fingers causing movement of said housing against its associated resilient means to move the fingers inwardly of the housing member, said housing member being shaped adjacent the end from which the quill protrudes to shape a member when the fingers are moved inwardly of the housing member.

4. In a device of the character described, the combination of a housing member, a quill extending from one end of said housing member, said quill comprising a member slidably mounted in said housing member, and having resilient fingers extending outwardly of said housing member and provided with die members, said fingers being urged toward each other, a stem extending between said fingers and having a cam movable by said stem to separate said fingers, a housing engaging said slidably mounted member, resilient means for urging said last named housing toward said housing member, other resilient means for urging said stem outwardly of said fingers whereby said fingers move toward inoperative position, a member operatively associated with said stem and movable to move said stem against said other resilient means to thereby move the cam to separate said fingers, continued movement of said member after a predetermined separation of said fingers causing said housing to move against its associated resilient means, and causing the separated fingers to move inwardly of said housing member, said housing member being shaped adjacent the end from which the quill protrudes to shape a member when the fingers are moved inwardly of the housing member.

5. In a portable tool, in combination, a housing member having a bore extending axially from the front end to the rear end thereof, a tubular member mounted in said bore and projecting from opposite ends of the housing member, the front projecting end of the tubular member providing resilient fingers having die members, the rear projecting end of the tubular member providing bifurcated portions each having an axially disposed slot, a pivot pin located in said slots, a stem extending through the tubular member and having a cam located forwardly beyond the fingers, the opposite end of the stem being secured to the pivot pin, whereby movement of the pin rearwardly of the axially disposed slots moves the stem and said cam relative to the fingers to effect an expansion of the resilient fingers and thus the die member, and manually actuated means carried by the housing member for moving said pin.

6. In a portable tool, in combination, a housing member having a bore extending axially from the front end to the rear end thereof, a tubular member mounted in said bore and projecting from opposite ends of the housing member, the front projecting end of the tubular member providing resilient fingers having die members, the rear projecting end of the tubular member providing bifurcated portions each having an axially disposed slot, a pivot pin located in said slots, a stem extending through the tubular member and having a cam located forwardly beyond the fingers, the opposite end of the stem being secured to the pivot pin, whereby movement of the pin rearwardly of the axially disposed slots moves the stem and said cam relative to the fingers to effect an expansion of the resilient fingers and thus the die members, and means for moving said pin including a pair of handle members pivotally connected by said pin and having cam surfaces adapted to contact and have camming action on the housing members.

7. In a portable tool, in combination, a housing member having a bore extending axially from the front end to the rear end, a tubular member slidably mounted in said bore and projecting from opposite ends of the housing member, the front projecting end of the slidable member providing resilient fingers having die members, the rear projecting end of the slidable member providing bifurcated portions each having an axially disposed slot, a pivot pin located in the said slots, a stem extending through the slidably mounted member and having a cam located forwardly beyond the fingers, the opposite end of the stem being secured to the pivot pin, whereby movement of the pin rearwardly to an extent permitted by the axially disposed slots moves the stem and the cam relative to the fingers to effect an expansion of the resilient fingers and thus the die members, and whereby additional rearward movement of said pin effects movement of the stem and slidably mounted member as a unit with respect to the housing member, and manually actuated means carried by the housing member for moving said pin.

8. In a portable tool, in combination, a housing member having a bore extending axially from the front end to the rear end, a tubular member slidably mounted in said bore and projecting from opposite ends of the housing member, the front projecting end of the slidable member providing resilient fingers having die members, the rear projecting end of the slidable member providing bifurcated portions each having an axially disposed slot, a pivot pin located in said slots, a stem extending through said slidably mounted member and having a cam located forwardly beyond the fingers, the opposite end of the stem being secured to the pivot pin, whereby movement of the pin rearwardly of the axially disposed slots moves the stem and said cam relative to the fingers to effect an expansion of the resilient fingers and thus the die members, means for moving said pin including a handle member located adjacent each bifurcated portion and being pivotally connected by said pivot pin so that the handle members pivot on the same axis, each handle member providing a cam surface adapted to contact and have camming action on the housing member, and resilient means for maintaining said handles in spaced relation and for yieldingly biasing the stem in a position to locate the cam forwardly of the resilient fingers, whereby predetermined initial pivotal movement of the handle members to move the pin rearwardly for the length of said axially disposed slots effects movement of the stem relative to the slidably mounted member and whereby additional pivotal movement of the handle members effects movement of the stem and slidably mounted member as a unit with respect to the housing member.

9. In a portable tool, in combination, a housing member having a bore extending axially from the front end to the rear end, said front end of the housing member providing a tube-shaping portion and a transverse camming surface at the rear of said housing member, a tubular member slidably mounted in said bore and projecting from opposite ends of the housing member, the front projecting end of the slidable member providing resilient fingers having die members, the rear projecting end of the slidable member providing bifurcated portions each having an axially disposed slot, a pivot pin located in said slots, a stem extending through the slidably mounted member and having a cam located forwardly beyond the fingers, the opposite end of the stem being secured to the pivot, whereby movement of the pin rearwardly of the axially disposed slots moves the stem and the cam with respect to the fingers to effect an expansion of the resilient fingers and thus the die members, a housing engaging the bifurcated portions of the slidably mounted member, guide means fixed to the housing member and extending rearwardly of the camming surface for slidably guiding said housing, resilient means urging said housing toward the housing member and into contact with the said camming surface, a spring housing supported by said guiding means and located rearwardly of the pivot pin, a plunger carried by the spring housing and extending into the housing to yieldingly urge the stem forwardly to maintain the cam beyond the fingers, and means carried by the housing member for moving said pin including a pair of handle members pivotally connected by said pin and having cam surfaces adapted to contact and have camming action on the camming surface provided by the housing member.

KENLY C. BUGG.
HARRY L. HART.

REFERENCES CITED

The following references are of record in the file of this patent:

UNITED STATES PATENTS

| Number | Name | Date |
|---|---|---|
| 372,081 | Nebergall et al. | Oct. 25, 1887 |
| 370,876 | Kane | Oct. 4, 1887 |
| 889,242 | Kuntze | June 2, 1908 |
| 1,647,447 | Hartnett | Nov. 1, 1927 |
| 2,155,416 | Geyer | Apr. 25, 1939 |
| 2,179,248 | Bandish et al. | Nov. 7, 1939 |
| 2,275,614 | Dewald | Mar. 10, 1942 |
| 2,319,216 | Dewald | May 18, 1943 |
| 2,343,890 | Dewald | Mar. 14, 1944 |
| 924,049 | Faessler | June 8, 1909 |
| 40,967 | Van Guysling | Dec. 15, 1863 |
| 476,111 | Adams | May 31, 1892 |
| 1,539,643 | Bush | May 26, 1925 |